United States Patent Office 2,950,166
Patented Aug. 23, 1960

2,950,166

METHOD FOR SEPARATION OF PLUTONIUM FROM URANIUM AND FISSION PRODUCTS BY SOLVENT EXTRACTION

Glenn T. Seaborg, Lafayette, Calif., Walter J. Blaedel, Madison, Wis., and Matthew T. Walling, Jr., Richland, Wash., assignors to the United States of America as represented by the United States Atomic Energy Commission No Drawing. Filed Oct. 31, 1952, Ser. No. 318,072

36 Claims. (Cl. 23—14.5)

The process of this invention deals with the separation of uranium values, plutonium values and fission product values contained in aqueous solutions by means of solvent extraction.

It is an object of this invention to provide a process for the quantitative recovery of plutonium from aqueous solutions in which it is obtained in pure form.

It is also an object of this invention to provide a process for the recovery of plutonium and uranium from aqueous solutions of neutron-irradiated uranium whereby both plutonium and uranium are obtained practically quantitatively and each in a high degree of purity.

It is another object of this invention to provide a process for the separation of plutonium and uranium contained in aqueous solutions by solvent extraction in which a high degree of separation is accomplished.

It is another object of this invention to provide a process for the separation of plutonium values and uranium values from fission product values contained in aqueous solutions.

It is finally also an object of this invention to provide a process for the decontamination of uranium from plutonium and fission product values so that it is obtained in a condition satisfactory for re-use, for instance, in a neutronic reactor.

When neutron-irradiated uranium slugs are dissolved in nitric acid, a solution is obtained in which uranium is present in the hexavalent state and plutonium is in the tetravalent state. Fission products are present as nitrates. The quantity of uranyl nitrate is greatly predominant in the solution over that of plutonium nitrate. Tetravalent plutonium, in the presence of large quantities of uranium, is not extractable by most of the organic solvents usually employed for the solvent extraction processes, and it is therefore preferred when using such solvents to have the plutonium present in the hexavalent state so that it is co-extracted with the uranium and thus separated from the non-extractable fission product values. Likewise, it has been found that plutonium (VI) as well as plutonium (IV) cannot be back-extracted from a solvent extract solution with an aqueous, salting-out-agent-containing medium and that these higher-valent plutonium salts thus behave like uranium; this makes the separation of uranium from plutonium by selective back-extraction from the organic extract solution impossible. However, it has also been found that trivalent plutonium salts show an entirely different behavior in that they are back-extractable from an organic solution with aqueous solutions of a salting-out agent. These findings have been utilized in devising the process of this invention.

The process of the invention broadly comprises the steps of providing an aqueous nitric acid solution of the plutonium, uranium and fission product values to be separated, securing the plutonium in its hexavalent state, in which case uranium values are in the uranyl state, contacting the aqueous solution with a substantially water-immiscible organic solvent whereby the uranium and plutonium values are taken up by an organic extract phase while the fission product values preferentially remain in the aqueous solution, separating the aqueous solution and the organic extract phase, contacting the organic phase with an aqueous medium containing salting-out agent and a reducing agent for the plutonium whereby the plutonium is converted to its trivalent state and taken up by the aqueous medium, and separating the aqueous medium containing most of the plutonium from the organic extract phase containing most of the uranium.

It sometimes appears advisable to remove ruthenium, niobium and zirconium values from the nitric acid solution prior to oxidation of the plutonium. Various methods have been found suitable for this purpose. According to one method this is accomplished by adding potassium permanganate to the solution, for instance in a quantity to yield a concentration of 0.03 M $KMnO_4$, whereby the ruthenium is oxidized, and then sparging the solution with a gas, e.g. nitrogen and/or ozone whereby the ruthenium is volatilized in the form of $RuO_4$. Thereafter a reducing agent is added whereby the potassium permanganate is reduced and manganese dioxide precipitated. This precipitate carries the niobium and zirconium values; it is separated from the solution, for instance by centrifuging.

The concentration of the starting solution for the extraction process or "feed solution," as it will be referred to hereinafter, can be varied considerably; however, a concentration of about 2 M uranyl nitrate has been found most satisfactory. The nitric acid concentration, which also is not critical, may range from about 0.04 to 1.0 M, a concentration of 0.3 M being preferred.

The oxidizing agent for the conversion of tetravalent to hexavalent plutonium should be added in at least stoichiometric quantities with regard to the plutonium content. The oxidation may be satisfactorily carried out at room temperature; however, maintenance of a temperature between 60° and 80° C. for from fifteen to sixty minutes is preferred. An oxidizing agent, in order to be satisfactorily operative, must have an oxidation-reduction potential substantially more negative than that of Pu (III)→Pu (VI); in other words, it must have at least a potential of 1.1 volts, referring to the system of standard oxidation potentials which has the hydrogen-hydrogen ion couple as zero. Oxidizing agents found satisfactory for the process of this invention are bromates, permanganates, dichromates, persulfates, silver catalyst containing persulfate, tetravalent cerium compounds, chlorine, bromine, ozone in the presence of silver or cerium ions, periodic acid, alkali metal bismuthate, and cobaltic compounds. From all these, the dichromates are much preferred. In the case of sodium or potassium dichromate, an initial concentration of from 0.1 to 0.2 M, preferably 0.1 M, has given excellent results for a solution containing about 2 M uranyl nitrate. However, the dichromate concentration should not be below 0.01 M because below this value, and particularly at a dichromate concentration between 0.0005 and 0.005 M found critical, a considerable increase of cerium extraction occurs so that the degree of fission product decontamination would be impaired.

In addition to an oxidizing agent, a so-called holding oxidant is also advantageously added so that reduction of the hexavalent plutonium obtained is prevented. An excess of the oxidizing agent, e.g. dichromate, may function as such a holding oxidant. However, it has been found satisfactory to add another, weaker oxidizing agent as the holding oxidant. Permanganate, for instance, or potassium bromate have been found good holding oxidants. The combination of sodium bismuthate, as the oxidant, and potassium permanganate, as the holding oxidant, has given excellent results.

The extraction of uranium and plutonium is furthermore improved if carried out in the presence of a salting-out agent. The salting-out agent may be either added to the aqueous solution prior to extraction or else, in the case of a counter-current extraction, may be introduced in the form of a separate aqueous scrubbing solution for the solvent phase. The preferred salting-out agents comprise inorganic salts having high solubility in the aqueous solution to be extracted, low solubility in the organic solvent extract phase, and a common ion with respect to the compound being extracted. Thus, for the extraction of uranyl and plutonyl nitrates water-soluble nitrates are preferred; the following nitrates have proved to be suitable salting-out agents:

| | |
|---|---|
| $NaNO_3$ | $Ca(NO_3)_2$ |
| $KNO_3$ | $Sr(NO_3)_2$ |
| $LiNO_3$ | $Mg(NO_3)_2$ |
| $NH_4NO_3$ | $La(NO_3)_3$ |
| $Mn(NO_3)_2$ | $Al(NO_3)_3$ |

The quantity of salting-out agent which should be added in any particular case will depend on the concentration of nitrate anion already present in the solution. In the case of a 0.3 M nitric acid solution, for instance, it is satisfactory to have a concentration of at least 2 N total nitrate, excluding the uranyl nitrate, by preferably adding from 3 to 7 N nitrate as a scrubbing solution.

The preferred class of solvents for the process of this invention are normally liquid organic solvents which are substantially immiscible with the aqueous solution to be extracted and which contain at least one atom capable of donating an electron pair to a coordination bond. Such extractants are good solvents for hexavalent uranium and hexavalent plutonium but not for fission products and not for trivalent plutonium. Suitable solvents are water-immiscible organic compounds containing an oxygen, sulfur, or nitrogen electron-donor atom. It will be evident, however, that most nitrogen-containing organic compounds of this type are basic in nature and will be unsuitable for the reaction of acidic aqueous solutions. Such compounds may be used, if desired, to extract substantially neutral solutions containing small amounts of hexavalent plutonium. Most organic solvents containing oxygen or sulfur donor atoms may be used for the extraction of acidic aqueous solutions as well as neutral solutions, and the oxygenated organic solvents are the preferred extractants for use in the present process.

Although most normally liquid organic compounds containing an atom with excess electrons, such as oxygen, sulfur, or nitrogen, are capable of forming a coordination bond, it will be evident to those skilled in the art that certain molecular structures can interfere with this electron-donating property. Electron-attracting constituents, such as halogen atoms, can offset the electron-donating property of an atom, such as oxygen, if present in sufficient number and proper relationship to the donor atom. For this reason it is preferable to employ compounds containing only carbon, hydrogen and electron-donor atoms. It will also be apparent that certain molecular configurations can give rise to steric hindrance which may interfere sufficiently to prevent the formation of coordination bonds. Tertiary carbon atoms adjacent an electron-donor atom and long chains of non-donor atoms linked to a donor atom are especially undesirable in this respect. The preferred solvents are those in which the donor atom is linked to a hydrogen atom or to non-tertiary carbon atoms and in which at least one component linked to the donor atom contains less than four consecutive non-donor atoms.

The following are examples of suitable solvents for use in the present process:

Ethyl ether
Bis($\beta$-chloroethyl) ether
Isopropyl ether
Glycol ethers
Methyl ethyl ether plus xylene plus acetone
2-phenoxyethanol
2-benzyloxyethanol
2-($\beta$-ethylbutoxy) ethanol
1,2-diethoxyethane
1-ethoxy-2-butoxyethane
1,2-dibutoxyethane
Bis($\beta$-butoxyethyl) ether
1,2-bis($\beta$-chloroethoxy)ethane
5,8,11,14,17-pentoxaheneicosane
o-Nitroanisole
2,6-dimethyl-1,4-dioxane
1-oxa-2,5-dimethylcyclopentane
Ethyl sulfide
Hexanol
Heptanol
Heptadecanol
2-ethylbutanol
Methylisobutylcarbinol
Methyl ethyl ketone
Triglycol dichloride
Methyl amyl ketone
Methyl isobutyl ketone (hexone)
Mesityl oxide
Acetophenone
Cyclopentanone
Cyclohexanone
4-methylcyclohexanone
Menthone
Isophorone
Nitromethane
Nitroethane
1-nitropropane
Nitrobutane
Nitrobenzene
Tributyl phosphate Of all of these solvents, the ketones, and in particular, hexone, are the preferred materials.

It is advantageous that the solvent contains free mineral acid, preferably nitric acid, for instance in a concentration of from 0.1 to 1 M. In hexone, a concentration of between 0.2 and 0.5 M of nitric acid has given the best results.

As has been mentioned above, the use of a salt scrubbing solution is beneficial for the purpose of effecting decontamination of the solvent phase obtained by the extraction, which means it is beneficial for removing some fission product values partially extracted. For a uranyl nitrate aqueous feed solution of a concentration of 2 M, an 8 M solution of ammonium nitrate or an aluminum nitrate solution of from 0.5 to 2 M has been found most suitable.

Aluminum nitrate, apart from being non-hazardous, has the further advantage that it is automatically obtained in the feed solution when uranium slugs are dissolved in nitric acid if they still have some of the jacketing and/or jacket-bonding materials, which usually consist of aluminum alloys, adhering thereto.

The phase separation is carried out by any of the means or methods known to those skilled in the art. The solvent phase contains the bulk of the plutonium and uranium originally present in the aqueous solution and is treated for the separation of the two.

For this purpose, the plutonium is first converted to its trivalent state by contacting with an aqueous medium containing a reducing agent; this step is vital in order to create selective extractability from the solvent phase with an aqueous salting-out agent-containing medium. All reducing agents which have an oxidation-reduction potential above $-1.1$ volts are suitable; however, with uranium present, the reducing agent should not be so powerful as to reduce also hexavalent uranium. The preferred reducing agent for this purpose is a ferrous ion-containing substance, for instance ferrous ammonium sulfate. An excess of the ferrous salt is preferably used. The reduction may be carried out at room temperature.

The addition of a holding reductant is advisable for the purpose of maintaining the plutonium in the trivalent state and also of preventing the oxidation of ferrous ions to ferric ions by the nitric acid. Many substances have been found suitable holding reductants to be used in connection with ferrous ions as the reducing agent; such substances are urea, formaldehyde, methyl alcohol, ethyl alcohol, hydrazine, and sulfamic acid or sulfamates. Hydrazine and sulfamic acid anions are the preferred holding reductants. A very satisfactory combination of reducing agent and holding reductant is a solution containing ferrous ammonium sulfate or other ferrous salt, preferably in a concentration of from 0.05 to 0.1 M, plus hydrazine, preferably in a concentration of about 0.5 N. The most advantageous combination, however, is ferrous sulfamate because it has the ferrous ion of the reducing agent and the sulfamic anion of the holding reductant combined in one substance. The preferred range of ferrous sulfamate is 0.001 to 0.5 M. The ferrous sulfamate is preferably added to the aqueous salting-out agent-containing medium to be used for the back-extraction of the formed plutonium (III) values from the solvent.

After back-extraction, the organic solvent phase which contains most of the uranium values is separated from the aqueous phase which contains most of the plutonium values. The aqueous extract phase is preferably scrubbed with another considerably smaller quantity of solvent which advantageously contains nitric acid, for instance in a concentration of 0.01 to 0.1 M, and optionally also hydrazine, for instance in a concentration of 0.15 M. This scrubbing procedure, however, may also be carried out prior to the phase separation. In fact, the latter procedure is preferred if a continuous column operation is chosen for the process. This scrubbing step, which is optional, accomplishes the removal of any traces of uranium which have been back extracted from the solvent together with the trivalent plutonium nitrate.

The solvent phase, which contains the uranium, may then be subjected to a separate back-extraction step; this is carried out with acidified water, for instance with 0.1 M nitric acid, whereby the uranium is recovered in pure and concentrated form and the solvent is made ready for re-use or recycling.

The aqueous phase obtained by the back-extraction of the trivalent plutonium may be subjected to methods known to those skilled in the art for the recovery of plutonium from aqueous solutions. For instance, the plutonium may be precipitated with hydrogen fluoride or other soluble fluorides, with iodate, with a hydroxide, etc.

The plutonium in the initial feed solution can be reduced to its trivalent state followed by immediate selective extraction of uranyl salt. This procedure is especially advantageous if no fission product values are present in the solution from which the uranium and plutonium are to be recovered.

In the following, two examples are given of the process of this invention for illustrative purposes only without the intention to limit the invention to the details given therein.

Example I

A neutron-irradiated uranium slug was dissolved in nitric acid and the concentration was adjusted to yield a solution 2.04 M in uranyl nitrate and 0.32 M in nitric acid. To this solution sodium dichromate was added in a quantity to yield a concentration of 0.1 M. This "feed solution" was allowed to stand for twenty-four hours and then introduced, at a flow rate of 10 cc./min., in the upper part of the central section of an extracted column. Near the bottom of this extraction column, hexone 0.5 M in nitric acid was introduced at a flow rate of 40 cc./min. while near the top of the column an aqueous 1.4 M aluminum nitrate scrub solution was introduced at a flow rate of 10.9 cc./min. The hexone extract phase which separated at the top of the column contained the bulk of the plutonium and the uranium.

This ketone extract phase was then introduced into a back-extraction or "stripping" column at about its center and contacted with an aqueous reducing solution introduced near the top of this stripping column at a flow rate of 4 cc./min. The reducing solution was 1.04 M in aluminium nitrate, 0.2 M in nitric acid, 0.1 M in hydrazine and 0.05 M in ferrous ammonium sulfate. A scrub hexone solution 0.035 M in nitric acid and 0.05 M in hydrazine was introduced near the bottom of the stripping column at a flow rate of 20 cc./min. The aqueous phase obtained at the bottom of this column contained the bulk of the plutonium in trivalent form while the solvent lay on top of the aqueous phase contained the bulk of the uranium.

The uranium-containing solvent phase was separated and treated in a third colum for back-extraction of the uranium into an aqueous soltuion. For this purpose, the uranium solvent phase was introduced near the bottom of this third column and contacted with 0.1 M nitric acid entering the column near the top at a flow rate of 20 cc./min. The aqueous phase separating at the bottom contained practically all of the uranium.

The results and efficiency of the process are obvious from the compilation of data given below in which the degree of separation and decontamination is illustrated for each step by means of the various concentrations.

Aqueous "waste" solution leaving first column after extraction:

(a) Uranium, percent of quantity in feed____ 0.05
(b) Plutonium, percent of quantity in feed___ 0.13

Aqueous phase leaving second column after back-extraction of plutonium from solvent phase from first column:

(a) Uranium, percent of quantity in feed__ 0.0001
(b) Plutonium, percent of quantity in feed__ ~100
(c) Beta decontamination _____ $10^{3.9}$
(d) Gamma decontamination _____ $10^{3.2}$ (Decontamination=activity in feed solution:activity in solution obtained.)

Aqueous phase leaving third column after back-extraction of uranium from solvent phase of second column:

(a) Uranium, percent of quantity in feed____ >97
(b) Plutonium, percent of quantity in feed___ 0.18
(c) Beta decontamination _____ $10^{3.2}$
(d) Gamma decontamination _____ $10^{2.4}$ Content of depleted solvent phase of third column:

(a) Uranium, percent of quantity in feed____ 0.01
(b) Plutonium, percent of quantity in feed____ 0.09
(c) Beta activity, percent of quantity in feed__ 0.08
(d) Gamma activity, percent of quantity in feed _____ 0.5

This table clearly illustrates the high efficiency of the process of this invention in regard to recovery and decontamination of plutonium and uranium.

Example II

Another experiment was carried out with a similarly composed dissolver solution but using ferrous sulfamate as the reductant and holding agent. The concentrations, flow rates and yields of the various columns are compiled in the table below.

|  | Relative Flow Rate | Density | Percent Uranium as compared with concentration in feed solution | Percent Plutonium as compared with concentration in feed solution | Decontamination Factor [1] | Concentration | | | | | |
|---|---|---|---|---|---|---|---|---|---|---|---|
|  |  |  |  |  |  | HNO$_3$ (M) | UO$_2$(NO$_3$)$_2$ (M) | Al(NO$_3$)$_3$ (M) | Na$_2$Cr$_2$O$_7$ (M) | Fe(II) (M) | (H$_2$NSO$_3$)- (M) |
| Column A: |  |  |  |  |  |  |  |  |  |  |  |
| scrub solution | 100 | 1.190 | ---- | ---- | ---- | 0.3 | ---- | 1.3 | ---- | ---- | ---- |
| Feed solution | 100 | 1.655 | 100 | 100 | 1 | 0.5 | 2.0 | ---- | 0.1 | ---- | ---- |
| Hexone Extractant | 400 | 0.819 | ---- | ---- | ---- | ---- | ---- | ---- | ---- | ---- | ---- |
| Hexone extract phase | 424 | 0.971 | 99.9 | 99.9 | 200 | 0.21 | 0.472 | negative | ---- | ---- | ---- |
| Aqueous (waste) phase | 175 | 1.145 | 0.1 | 0.1 | 1.005 | 0.8 | ---- | 0.74 | 0.05 | ---- | ---- |
| Column B: |  |  |  |  |  |  |  |  |  |  |  |
| Back-extracting medium | 40 | 1.197 | ---- | ---- | ---- | ---- | ---- | 1.28 | ---- | 0.05 | 0.10 |
| Hexone extract phase from Col. A | 424 | 0.971 | 99.9 | 99.9 | 200 | 0.21 | 0.472 | ---- | ---- | ---- | ---- |
| Scrub-hexone | 200 | 0.800 | ---- | ---- | ---- | 0.01 | ---- | ---- | ---- | ---- | ---- |
| Uranium-containing hexone phase | 624 | 0.916 | 99.9 | 0.1 | 200 | 0.145 | 0.321 | ---- | ---- | ---- | ---- |
| Plutonium-containing aqueous phase | 40.4 | 1.193 | 2.5×10$^{-5}$ | 99.8 | 2×10$^3$ | 0.01 | ---- | 1.277 | ---- | 0.05 | 0.10 |
| Column C: |  |  |  |  |  |  |  |  |  |  |  |
| Aqueous back-extracting medium | 200 | 1.000 | ---- | ---- | ---- | 0.1 | ---- | ---- | ---- | ---- | ---- |
| Uranium-containing hexone phase from Column B | 624 | 0.916 | 99.9 | 0.1 | 200 | 0.145 | 0.321 | ---- | ---- | ---- | ---- |
| Depleted hexone phase | 588 | 0.800 | 0.01 | negative | 400 | 0.01 | ---- | ---- | ---- | ---- | ---- |
| Uranium-containing aqueous phase | 234 | 1.287 | 99.9 | 0.1 | 400 | 0.40 | 0.85 | ---- | ---- | ---- | ---- |

[1] Decontamination factor = $\frac{\text{quantity of fission products in feed solution}}{\text{quantity of fission products in solution obtained}}$ The aqueous phase obtained in the second column of the trivalent plutonium after back-extraction may be subjected to additional extraction processes for further separation. For this purpose, it is necessary to re-oxidize the trivalent plutonium to its hexavalent state in order to make it again solvent-extractable and also to add a salting-out agent. After extraction plutonium can be back-extracted by water containing a small amount of nitric acid. The oxidation may be carried out advantageously with a solution of dichromate, preferably of a concentration of about 0.02 M. However, other oxidizing agents have been found suitable although not quite as satisfactory as the dichromate. Treatment, for instance, with permanganate followed by treatment with hydrogen peroxide has also given satisfactory results. Other cross-over oxidants suitable are sodium peroxide, hydrogen peroxide, ceric ions, ozone, and ammonium persulfate.

In the present process, previously known extraction procedures and apparatus may be employed. The extraction may be effected by batch, continuous batch, batch countercurrent, or continuous countercurrent methods. The most efficient extraction is obtained in continuous countercurrent operation. The usual types of extraction equipment and the usual operating procedures may be employed when effecting the present extraction in this manner. Thus, for example, if the solvent is lighter than water, satisfactory extraction in accordance with this procedure may be obtained by the use of a packed column with aqueous feed at an intermediate point, solvent feed at the bottom of the column, and solvent draw-off at the top of the colunm. The top section of such a column may serve as a scrubbing section, and an auxiliary scrubbing medium may be charged to the top of the column. With certain obvious changes, solvents heavier than water can be employed with substantially equally good results. Agitation of the liquids for a more thorough contact is advantageous.

It will be understood that this invention is not to be limited to the details given herein but that it may be modified within the scope of the appended claims.

What is claimed is:

1. The process of separating uranium values, plutonium values and fission product values contained in an aqueous solution, comprising providing a nitric acid solution of said values, securing the plutonium in its hexavalent oxidation state, contacting the nitric acid solution with a substantially water-immiscible organic solvent whereby the uranium and plutonium values are taken up by an organic extract phase, separating the aqueous solution and the organic extract phase, contacting the organic phase with an aqueous medium containing a reducing agent for the plutonium and a salting-out agent whereby the plutonium is converted to its trivalent state and back-extracted into said aqueous medium, and separating the plutonium-containing aqueous medium from said uranium-containing organic extract phase.

2. The process of claim 1 wherein the nitric acid solution contains uranyl nitrate in a concentration of about 2 M.

3. The process of claim 2 wherein the nitric acid solution contains from 0.04 to 1 M nitric acid.

4. The process of claim 1 wherein an oxidizing agent is added to said nitric acid solution for the oxidation of plutonium to its hexavalent state.

5. The process of claim 4 wherein the oxidizing agent is a water-soluble dichromate.

6. The process of claim 5 wherein the dichromate is present in a concentration of from 0.1 to 0.2 M.

7. The process of claim 1 wherein a holding oxidant is added to the nitric acid solution prior to extraction.

8. The process of claim 7 wherein the holding oxidant is potassium bromate.

9. The process of claim 7 wherein the holding oxidant is potassium permanganate.

10. The process of claim 7 wherein an excess of dichromate is used as a holding oxidant.

11. The process of claim 1 wherein sodium bismuthate as an oxidant for plutonium is added to said nitric acid solution and potassium permanganate is added as a holding oxidant.

12. The process of claim 1 wherein contacting of the nitric acid solution with said organic solvent is carried out in the presence of a salting-out agent.

13. The process of claim 12 wherein the salting-out agent is a water-soluble nitrate.

14. The process of claim 13 wherein the nitrate is ammonium nitrate.

15. The process of claim 14 wherein the ammonium nitrate is provided in the form of a scrubbing solution of a concentration from 3 to 7 M.

16. The process of claim 13 wherein the nitrate is aluminum nitrate.

17. The process of claim 16 wherein the aluminum nitrate concentration ranges from 0.5 to 2 M.

18. The process of claim 1 wherein the organic solvent is a ketone.

19. The process of claim 18 wherein the ketone is hexone.

20. The process of claim 19 wherein the hexone is acidified.

21. The process of claim 20 wherein the hexone contains nitric acid in a concentration of about from 0.1 to 1 M.

22. The process of claim 1 wherein the reducing agent is dissolved in the back-extracting aqueous medium.

23. The process of claim 1 wherein the reducing agent for plutonium is a ferrous ion-containing substance.

24. The process of claim 23 wherein the reducing agent is ferrous ammonium sulfate.

25. The process of claim 1 wherein a holding reductant is incorporated into the organic extract phase together with the reducing agent.

26. The process of claim 25 wherein the holding reductant is hydrazine.

27. The process of claim 26 wherein ferrous ammonium sulfate is added as reducing agent in a quantity to obtain a concentration of from 0.05 to 0.1 M and hydrazine in a quantity to obtain a concentration of 0.5 N.

28. The process of claim 25 wherein the holding reductant is a substance containing sulfamic acid anions.

29. The process of claim 28 wherein ferrous sulfamate is added as a combined reducing agent and holding reductant.

30. The process of claim 29 wherein the ferrous sulfamate is present in a concentration of from 0.001 to 0.5 M.

31. The process of claim 1 wherein the plutonium-containing aqueous medium, after back-extraction, is scrubbed with acidified solvent.

32. The process of claim 31 wherein the acidified solvent is hexone containing from 0.01 to 0.1 M nitric acid.

33. The process of claim 32 wherein the acidified hexone also contains about 0.15 M hydrazine.

34. The process of claim 1 wherein the uranium is back-extracted from the plutonium-depleted organic extract phase by contacting it with an aqueous means.

35. The process of claim 34 wherein the aqueous means is 0.1 M nitric acid.

36. The process of separating uranium values, plutonium values and fission product values contained in an aqueous solution, comprising providing a nitric acid solution of said values, adding sodium dichromate to said solution in an amount sufficient to secure the plutonium in its hexavalent oxidation state, contacting the nitric acid solution with hexone containing free nitric acid whereby the uranium and plutonium values are taken up by a hexone extract phase, separating the aqueous solution and the hexone extract phase, contacting the hexone phase with an aqueous medium containing ferrous sulfamate and aluminum nitrate whereby the plutonium is converted to its trivalent state and back-extracted into said aqueous medium, and separating the plutonium-containing aqueous medium from said uranium-containing hexone extract phase.

References Cited in the file of this patent

UNITED STATES PATENTS

| | | |
|---|---|---|
| 2,811,415 | Seaborg | Oct. 29, 1957 |
| 2,903,332 | Callis et al. | Sept. 8, 1959 |

UNITED STATES PATENT OFFICE
CERTIFICATE OF CORRECTION

Patent No. 2,950,166            August 23, 1960

Glenn T. Seaborg et al.

It is hereby certified that error appears in the printed specification of the above numbered patent requiring correction and that the said Letters Patent should read as corrected below.

Column 3, line 44, for "reaction" read -- extraction --; column 6, line 1, for "extracted" read -- extraction --.

Signed and sealed this 11th day of April 1961.

(SEAL)
Attest:
ERNEST W. SWIDER

Attesting Officer

ARTHUR W. CROCKER
Acting Commissioner of Patents